United States Patent
Shirilla

(10) Patent No.: US 9,103,522 B2
(45) Date of Patent: Aug. 11, 2015

(54) PHOTOGRAPHIC REFLECTOR

(71) Applicant: John E. Shirilla, Davidson, NC (US)

(72) Inventor: John E. Shirilla, Davidson, NC (US)

( * ) Notice: Subject to any disclaimer, the term of this patent is extended or adjusted under 35 U.S.C. 154(b) by 106 days.

(21) Appl. No.: 13/934,637

(22) Filed: Jul. 3, 2013

(65) Prior Publication Data

US 2014/0022758 A1 Jan. 23, 2014

Related U.S. Application Data

(60) Provisional application No. 61/672,838, filed on Jul. 18, 2012.

(51) Int. Cl.
*G03B 15/06* (2006.01)
*F21V 7/00* (2006.01)
*G03B 17/56* (2006.01)

(52) U.S. Cl.
CPC .............. *F21V 7/0008* (2013.01); *G03B 15/06* (2013.01); *G03B 17/568* (2013.01)

(58) Field of Classification Search
CPC ..... G03B 15/05; G03B 15/06; G03B 15/0484
USPC ...................... 362/16, 18, 320, 352
See application file for complete search history.

(56) References Cited

U.S. PATENT DOCUMENTS

| | | | |
|---|---|---|---|
| 3,851,164 A | 11/1974 | Intrator | |
| 3,873,821 A * | 3/1975 | Larson | 362/3 |
| 4,052,607 A | 10/1977 | Larson | |
| 4,078,170 A | 3/1978 | Sloop | |
| 4,210,952 A | 7/1980 | Ressmeyer | |
| 4,446,506 A | 5/1984 | Larson | |
| 4,594,645 A | 6/1986 | Terashita | |
| 4,633,374 A | 12/1986 | Waltz et al. | |
| 4,757,425 A | 7/1988 | Waltz | |
| 4,807,089 A * | 2/1989 | Nussli | 362/17 |
| 3,294,962 A1 | 12/2002 | Shirilla | |
| 6,491,405 B1 | 12/2002 | Shirilla | |
| 7,063,428 B2 * | 6/2006 | Lowe | 362/18 |
| 2013/0322051 A1 * | 12/2013 | Ortiz-Gavin | 362/11 |

FOREIGN PATENT DOCUMENTS

JP 05-232553 9/1993

* cited by examiner

*Primary Examiner* — Peggy Neils
(74) *Attorney, Agent, or Firm* — Emerson Thomson Bennett

(57) ABSTRACT

An photographic reflector comprising a frame and a first cover. The frame may comprise a central post, a plurality of ribs connected to the central post and extendable outwardly therefrom to define a concavity, and, a plurality of struts connected to mid-span portions of said ribs, respectively and secured to the central post. The first cover may be conformed to the ribs and the concavity. The first cover may comprise a light reflective inner surface. The light reflective inner surface may have some maximum projected area having a perimeter, wherein the perimeter is non-circular.

18 Claims, 9 Drawing Sheets

PHOTOGRAPHIC REFLECTOR

I. BACKGROUND

In photographic trades, a reflector comprises a reflective surface used to direct light towards a given subject. Such reflectors may include a softbox, an umbrella-style reflector, or other types of reflectors.

A conventional umbrella-style reflector may be of interest, but the size and/or shape of the conventional umbrella-style reflector can present problems for the user. These problems may include issues with positioning the reflector, especially in low ceiling applications, problems with introducing unwanted light into a subject region such as into the background of a subject, and problems of being unwieldy due to size or bulk.

Accordingly, there remains a need in the art to provide an umbrella-style reflector with a modified size and/or shape to avoid or diminish the above-referenced problems.

II. SUMMARY

Provided is an photographic reflector comprising a frame and a first cover. The frame may comprise a central post, a plurality of ribs connected to the central post and extendable outwardly therefrom to define a concavity, and, a plurality of struts connected to mid-span portions of said ribs, respectively and secured to the central post. The first cover may be conformed to the ribs and the concavity. The first cover may comprise a light reflective inner surface. The light reflective inner surface may have some maximum projected area having a perimeter, wherein the perimeter is non-circular.

III. BRIEF DESCRIPTION OF THE DRAWINGS

The present subject matter may take form in certain components and arrangement of components, embodiments of which will be described in detail in this specification and illustrated in the accompanying drawings which form a part hereof, and wherein.

Figure 6:
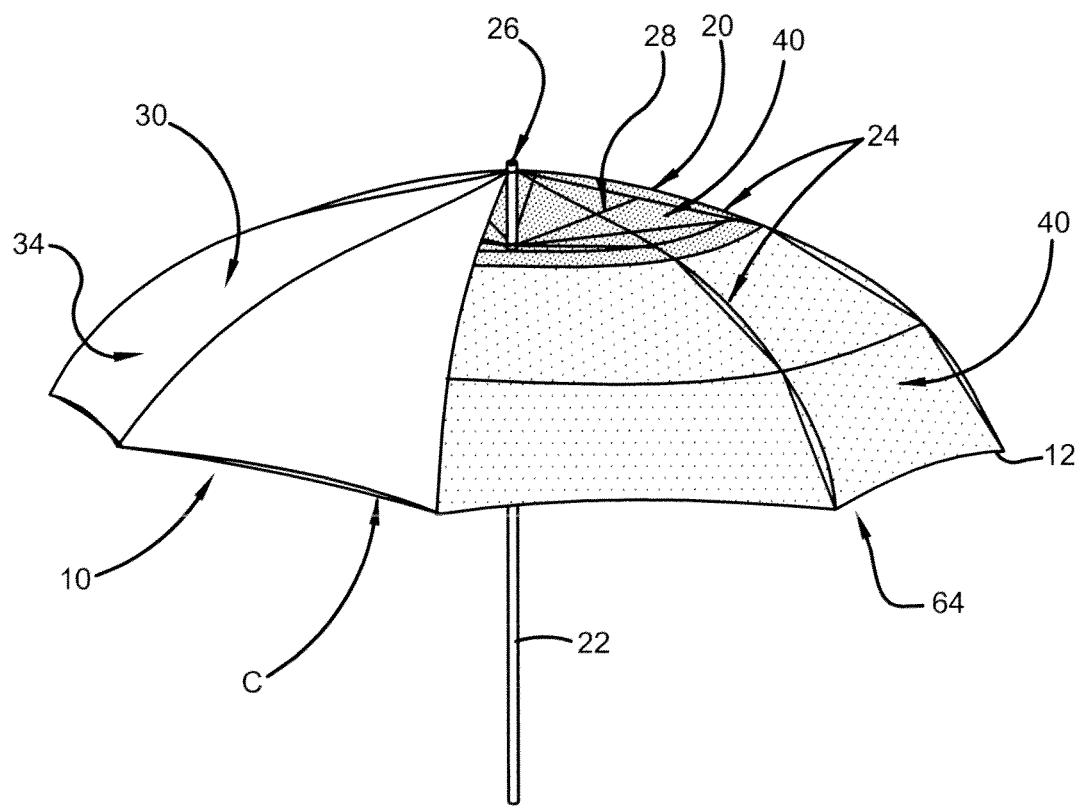

FIG. 6 a perspective view of one embodiment of a photographic reflector with a first cover member partially broken away to reveal a second optional cover member.

Figure 1:
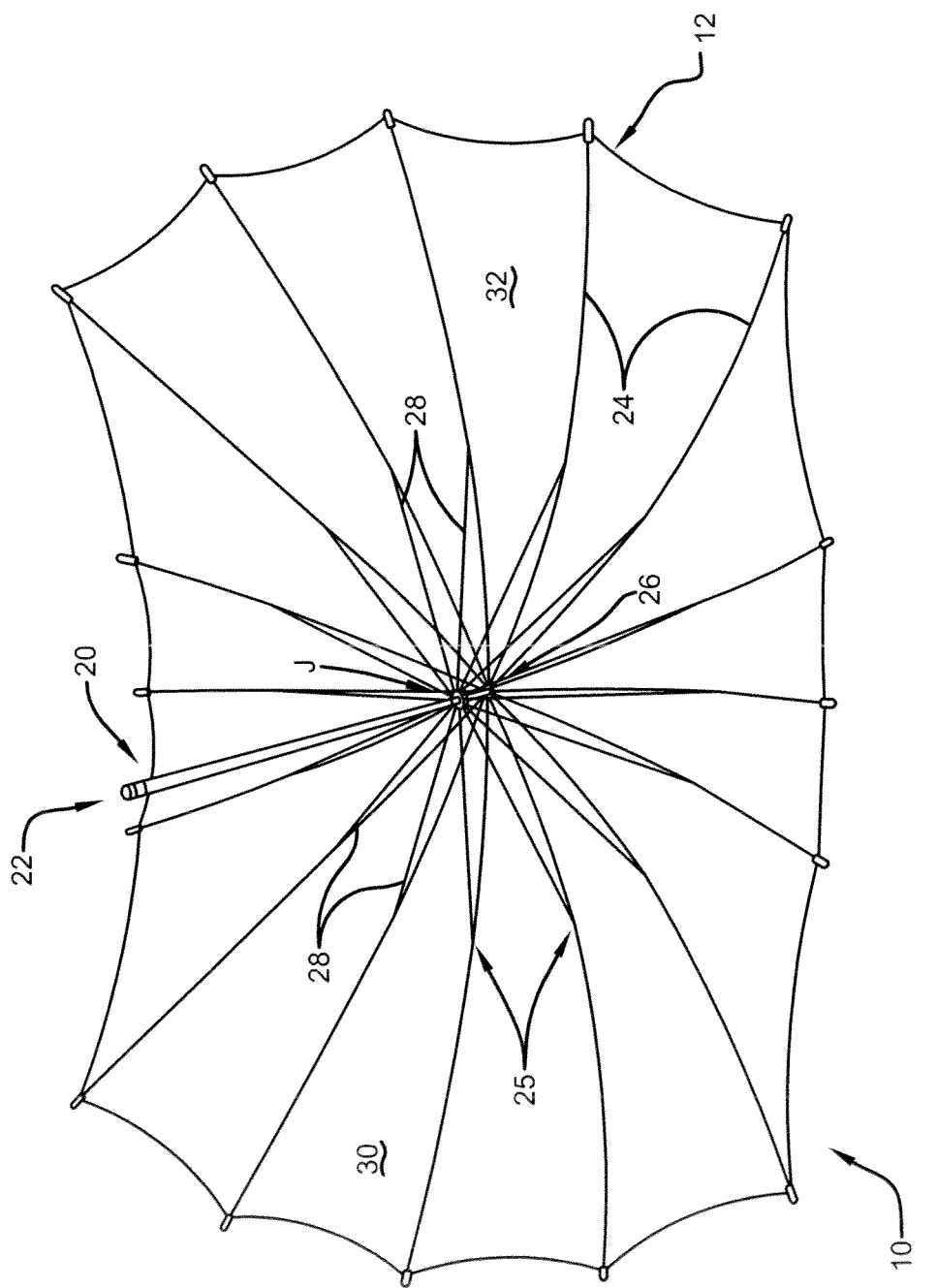
FIG. 1 is a view of one embodiment of a photographic reflector.
Figure 7:
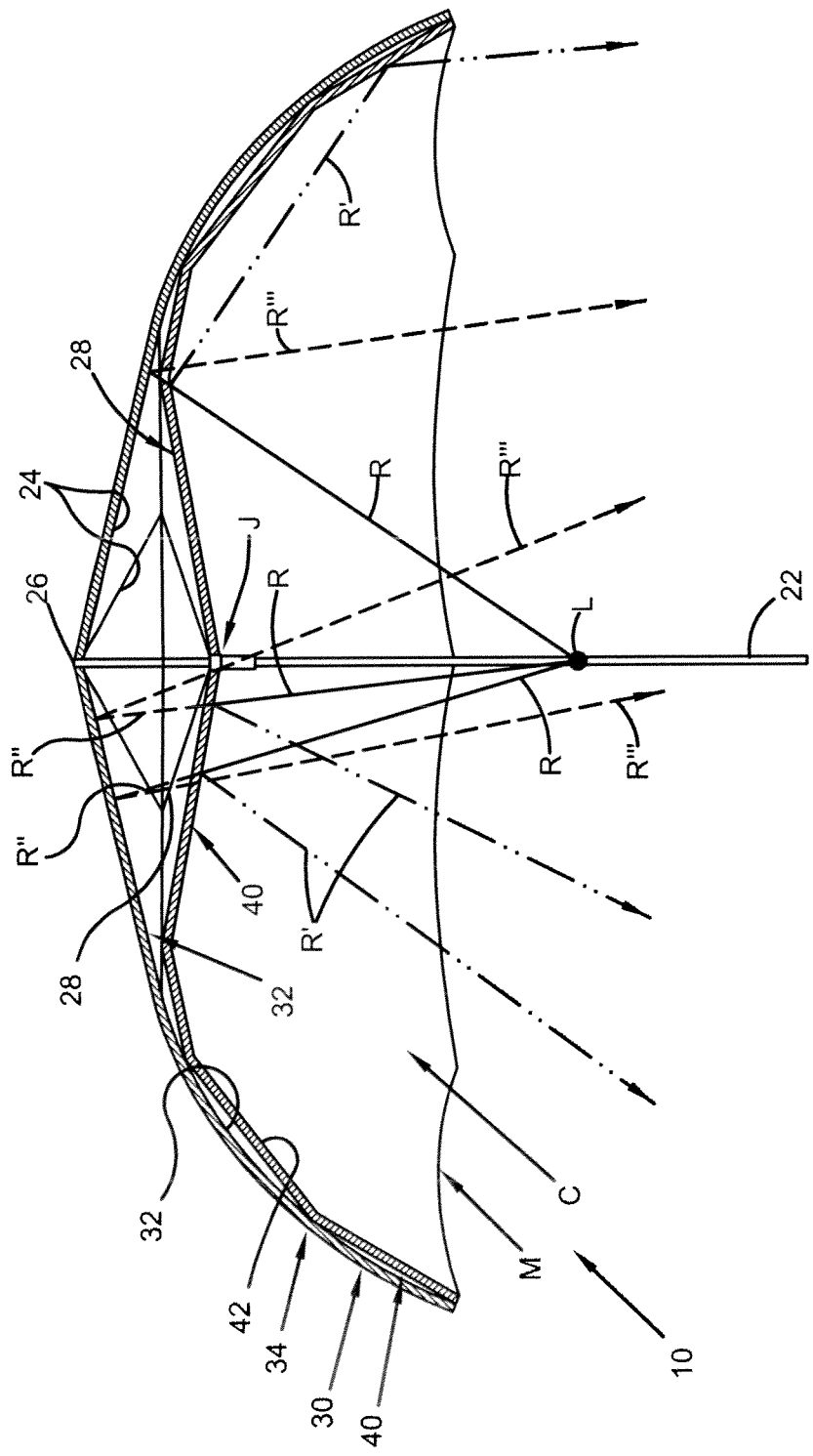

FIG. 7 is cross-sectional view of the photographic reflector of FIG. 1 and illustrates reflection and diffusion of light rays from a source.

Figure 8:
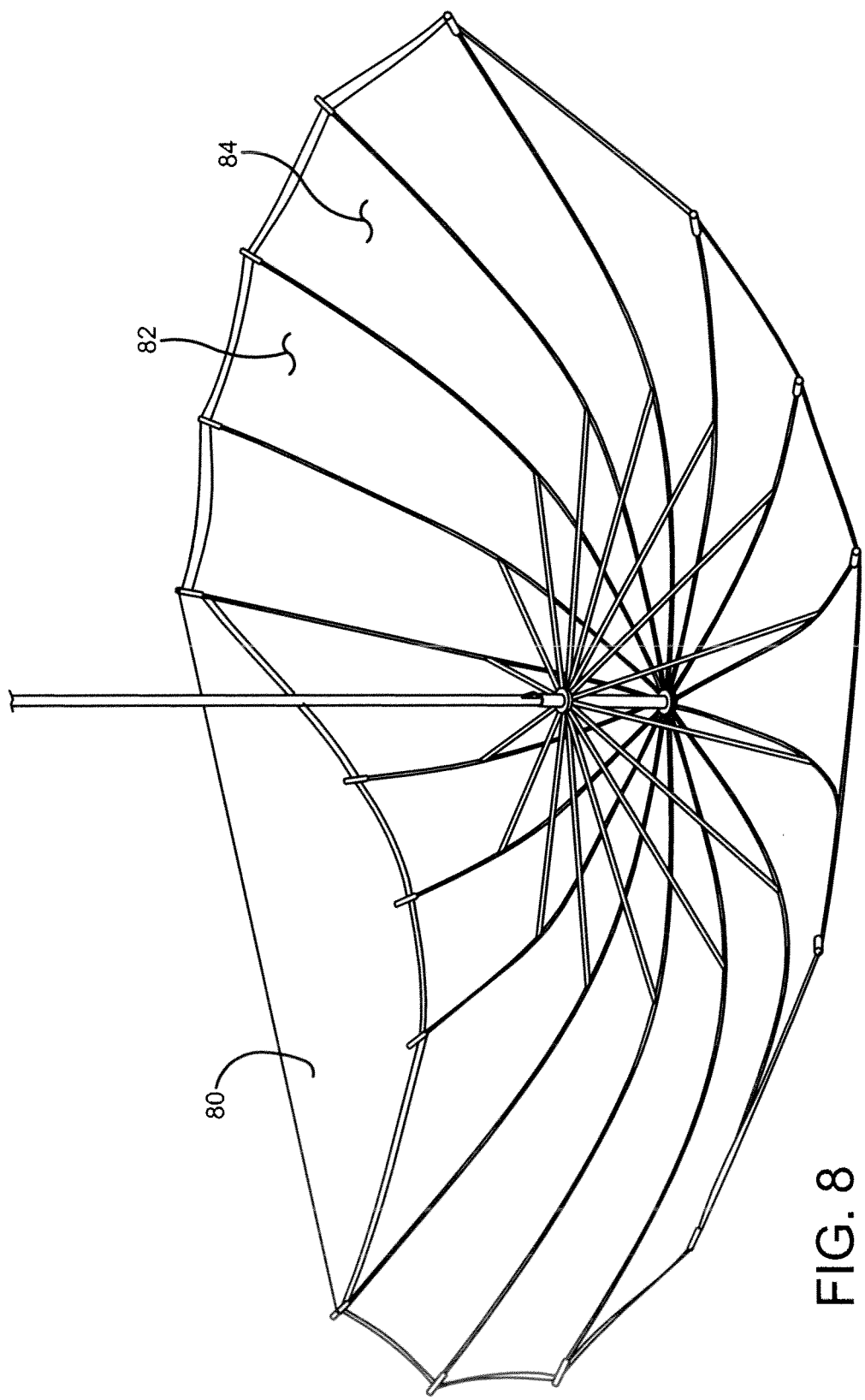

FIG. 8 a perspective view of one embodiment of a photographic reflector comprising an additional panel.

Figure 9:
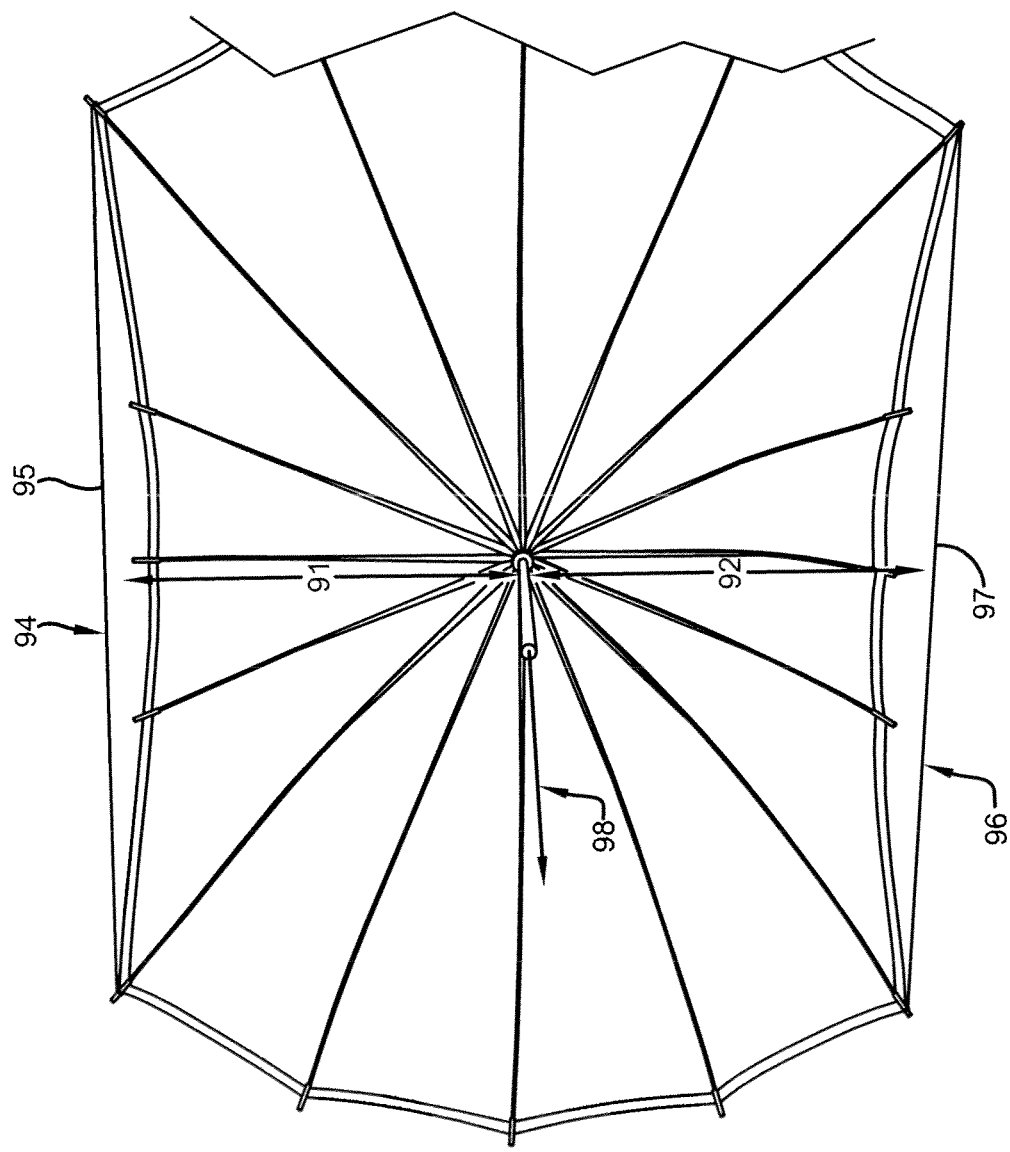

FIG. 9 a perspective view of one embodiment of a photographic reflector comprising two additional panels.

IV. DETAILED DESCRIPTION

Certain terminology is used herein for convenience only and is not to be taken as a limitation on the present subject matter. Relative language used herein is best understood with reference to the drawings, in which like numerals are used to identify like or similar items. Further, in the drawings, certain features may be shown in somewhat schematic form.

Referring now to FIGS. 1-9 wherein the showings are for purposes of illustrating embodiments of the present subject matter only and not for purposes of limiting same, FIG. 1 shows a photographic reflector 10 formed in accordance with the present subject matter. Except as otherwise illustrated and described, the photographic reflector 10 may be structurally similar to the umbrella-style reflector disclosed in U.S. Pat. No. 5,023,757.

In one embodiment, a photographic reflector 10 comprises a conventional frame 20 defined by a central post 22 to which a plurality of ribs 24 are attached. As will be addressed further herebelow, the frame 20 may be understood to be skeletal in the sense that the frame 20 is an infrastructure approximating a more complex structure to be engaged therewith. The ribs 24 may be all connected at one end to an innermost end 26 of the central post 22 in a circumferentially spaced-apart manner. The ribs 24 extend radially outwardly from the post end 26 in an arcuate manner so that a recess or concavity C, as shown in FIGS. 6 and 7, is defined. A plurality of struts 28 respectively interconnect a mid-span portion 25 of the ribs 24 to the central post 22. As used herein, unless otherwise noted, a mid-span portion 25 of a rib 24 may refers to any point between the endpoints of a rib 24. The frame 20 is collapsible in a conventional manner by sliding adjustment of the location J at which the struts 28 connect to the central post 22. In certain embodiments, a post 22, rib 24, and strut 28, may be interconnected to be adapted to function as a slider-crank mechanism. As shown in FIG. 7, a conventional source of light or other electromagnetic rays L may affixed to the post 22 or otherwise located to direct electromagnetic rays R, such as, without limitation, light, into the concavity C through an entrance or mouth M of same.

Figure 2:
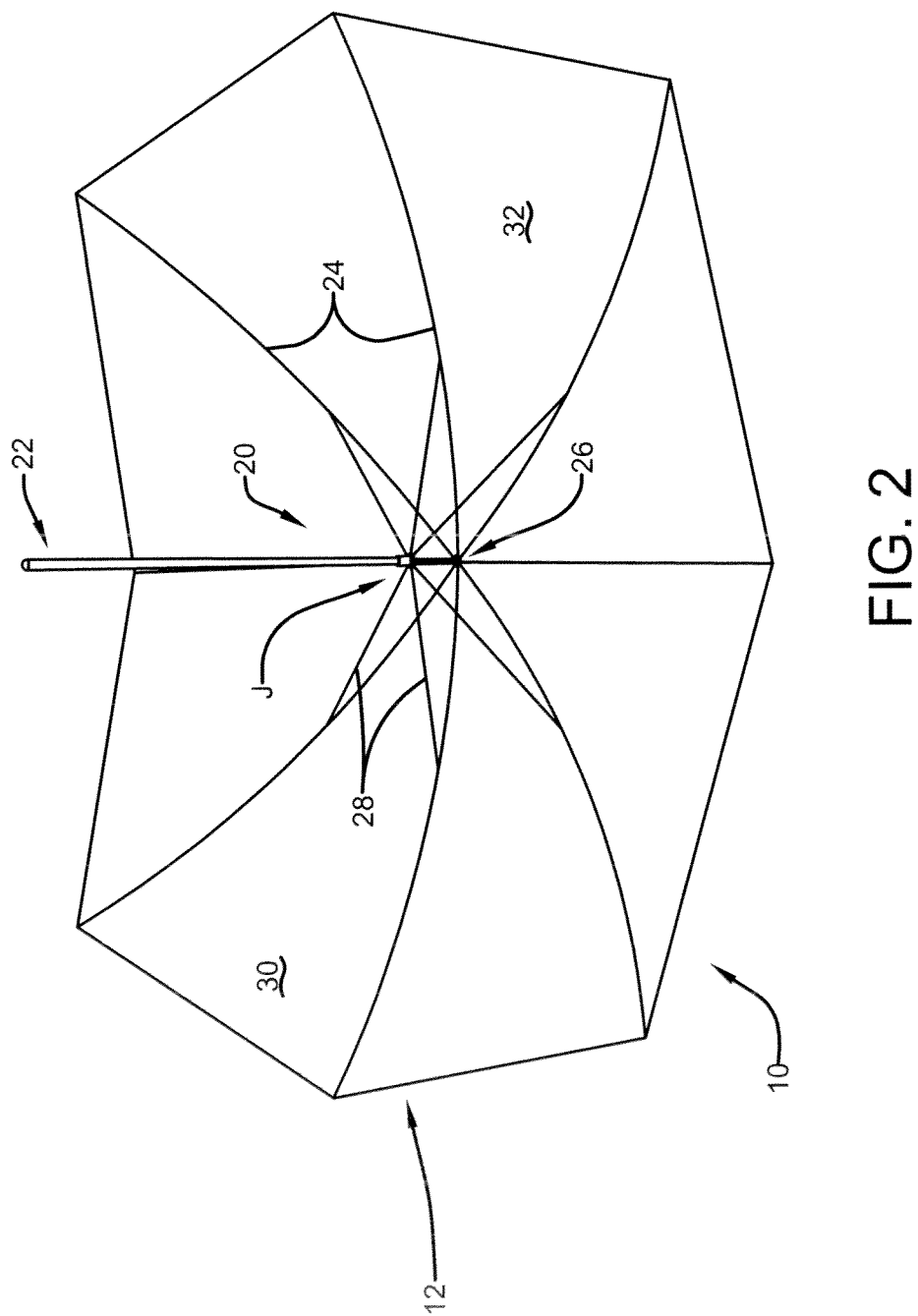
FIG. 2 is a view of another embodiment of a photographic reflector.
Figure 3:
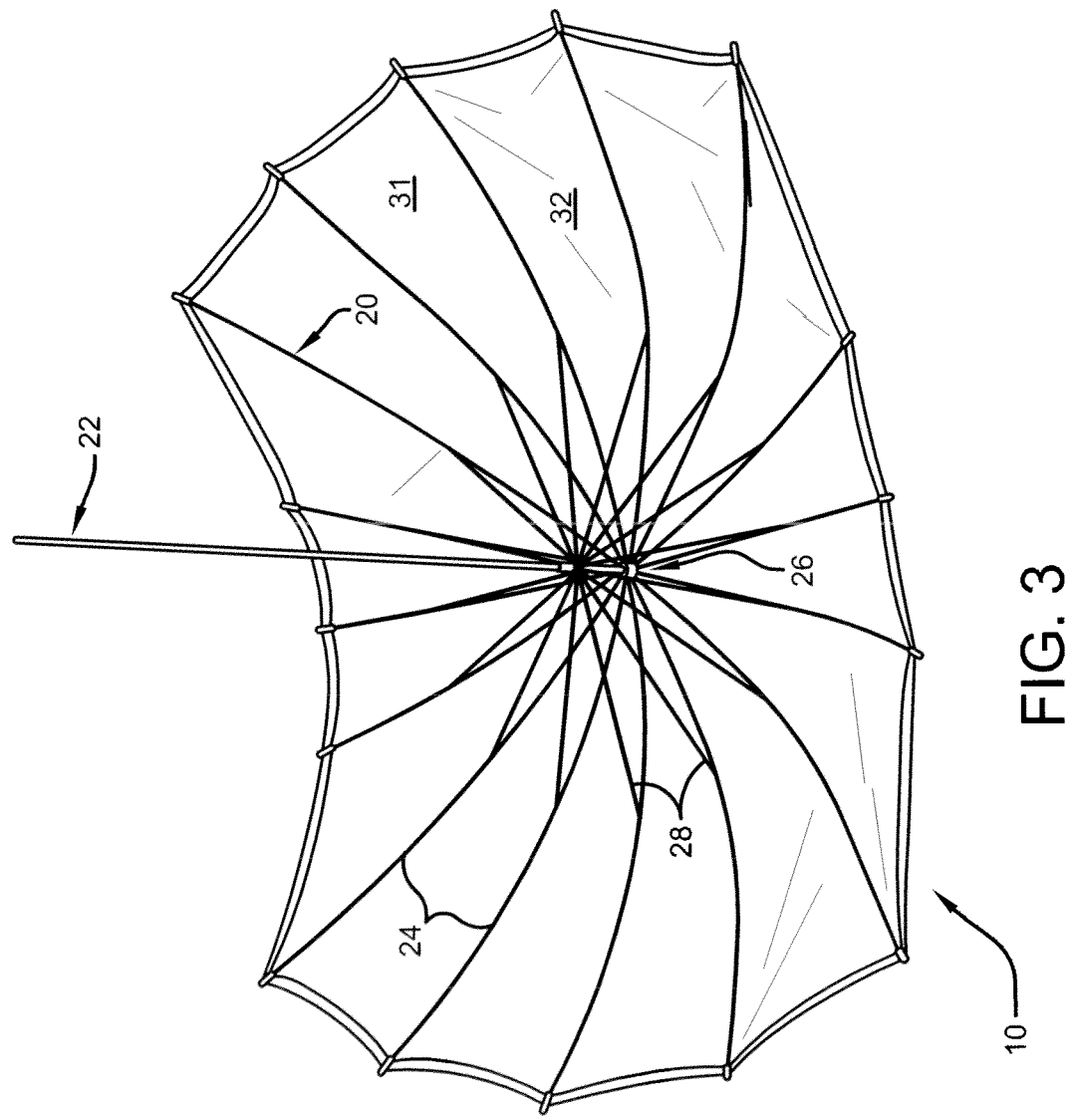
FIG. 3 is a view of another embodiment of a photographic reflector.
Figure 4:
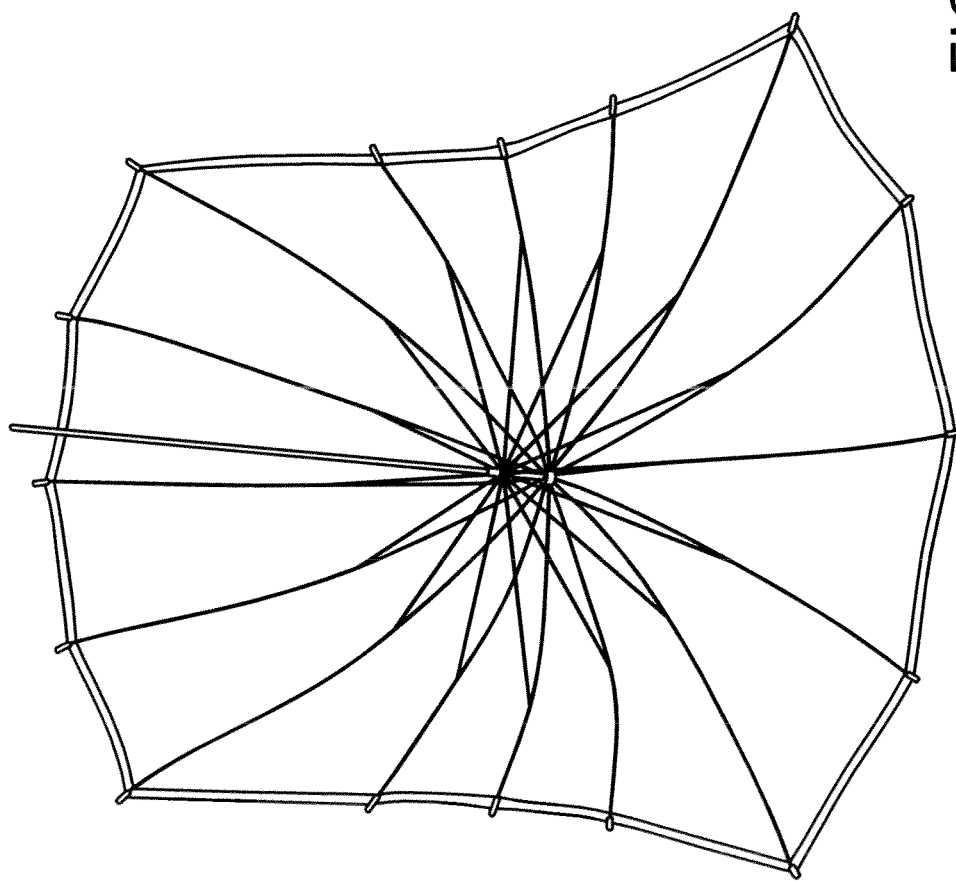
FIG. 4 is another view of the photographic reflector of FIG. 3.
Figure 5:
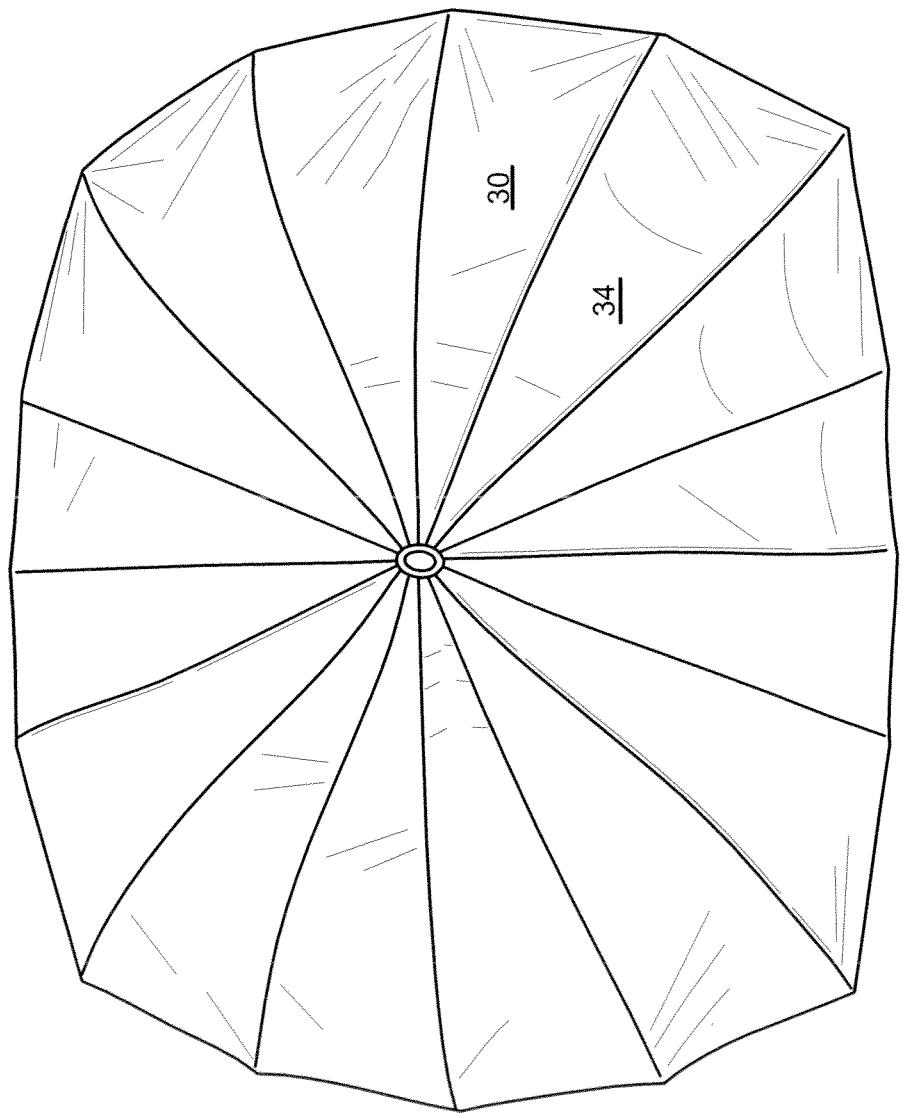
FIG. 5 is another view of the photographic reflector of FIG. 3.

In the embodiment shown in FIGS. 1 and 2, an inward facing reflective surface 32 may be secured to or lie adjacent to the ribs 24 and comprises or defines a surface that conforms to or further defines the concavity C defined by ribs 24 of skeletal frame 20. In FIGS. 1 and 2, the reflective surface 32 is part of a first cover 30. In certain embodiments, as shown in FIGS. 1 and 2, a photographic reflector 10 may comprise a first cover 30 consisting of a single layer having a reflective surface 32. In certain embodiments, as shown in FIGS. 3-5, a photographic reflector 10 may comprise a first cover 30 and one or more other layers 31 comprising a reflective surface 32. In the embodiment shown in FIGS. 3-5, a layer 31, is secured to or lies adjacent the ribs 24 and comprises or defines an inward facing reflective surface 32 that conforms to or further defines the concavity C defined by ribs 24 of skeletal frame 20. First cover 30, or layers 31, or reflective surface 32, may be defined from a textile, a film, a sheet, a net, a mesh or other compliant material selected with good engineering judgment. The reflective surface 32 may be reflective of one or more types of electromagnetic radiation including, but not limited to, light, infrared radiation, ultraviolet radiation, microwaves, sub-sets thereof, or combinations thereof. The reflective surface 32 may be polyester film, foil coating or any other suitable reflective material. In some embodiments, reflective surface 32 may comprise a polyester film made from stretched polyethylene terephthalate such as, without limitation, Mylar®. Reflective surface 32 may be tinted to have any desired color or colors such as gold, yellow, blue, pink or any other color. First cover 30 or layer 31 can be secured to ribs 24 so that the ribs 24 lie adjacent to the reflective surface 32 or so that the ribs 24 lie adjacent an outer surface 34 of the first cover member 30. As shown in the embodiment depicted in FIGS. 3-5, outer surface 34 may be dark, black, and may be substantially opaque, blocking or absorbing all or large amounts of the light or other electromagnetic rays incident thereupon. As shown in the embodiment depicted in FIGS. 6-7, outer surface 34 may be white, light, and may be substantially translucent transmitting some substantial amounts of the light or other electromagnetic rays incident thereupon.

In some embodiments, as shown in FIGS. 6-7, an optional second cover 40 may be secured in covering relation relative to the reflective surface 32 of the first cover member 30. Optional second cover 40 may be defined from a textile, a film, a sheet, a net, a mesh or other compliant material selected with good engineering judgment. The optional second cover member 40 allows incident light to pass therethrough so that the passed light is diffused. Optional second cover member 40 may be substantially translucent to one or more types of electromagnetic radiation including, but not limited to, light, infrared radiation, ultraviolet radiation, microwaves, sub-sets thereof, or combinations thereof. Optional second cover member 40 may be tinted to a desired color such as off-white, pink, rose, blue or any other color.

Reflective surface 32 may be highly reflective, reflecting all or almost all of the light or other electromagnetic radiation of interest incident thereupon, and transmitting or diffusing none or some small amount of the light or other electromagnetic radiation of interest incident thereupon. Optional second cover 40, may reflect some of the light or other electromagnetic radiation of interest incident thereupon but may also transmit and diffuse substantial amounts of the light or other electromagnetic radiation of interest incident thereupon in either direction so that it may act as a diffuser.

In one embodiment, optional second cover member 40 is secured in a manner where it is co-extensive with and closely adjacent to the entire reflective surface 32 of the first cover 30. In one embodiment, optional second cover 40 is arranged to be closely adjacent only a first, outer portion of first cover 30, where the outer portion of first cover 30 is the portion of the first cover member 30 located between the struts 28 and the mouth M of the concavity C. In this latter embodiment, optional second cover 40 is also placed in covering relation with the struts 28 to eliminate shadows or other light artifacts. In one embodiment, the portion of the optional second cover 40 that covers the struts 28 may be flat or planar so that the light reflected/diffused by this portion of the second cover member covers a wide area after exiting the mouth M of the umbrella cavity C.

In one non-limiting example of use, light rays R from the light source L enter the concavity C through the mouth M and are incident on the optional second cover 40. Some of this light R is reflected by optional second cover 40 (indicated at R') and exits the concavity C to light a subject. Other light rays R from the source L pass through optional second cover 40 and are diffused (as indicated at R"). These diffused light rays R" are then incident on the inner reflective surface 32 of the first cover 30 and are, thus, reflected. A portion of the light reflected by the reflective surface 32 again passes through and is diffused by optional second cover 40 and exits the mouth M of the concavity C (indicated at R'") to be directed at the subject.

In some embodiments, as shown in FIGS. 1-2, photographic reflector 10 comprises does not comprise optional second cover 40.

In the embodiments shown in FIGS. 1-2, the reflective surface 32 of first cover 30 is highly reflective, reflecting all or large amount of the light or other electromagnetic radiation of interest incident thereupon. In the embodiments shown in FIGS. 1 and 2, first cover 30 transmits some small amount of light or other electromagnetic radiation of interest incident upon reflective surface 32 and reflects large amount of the light or other electromagnetic radiation of interest incident upon reflective surface 32. In some embodiments, the small amount of light transmitted through surface 32 may be sufficiently great for the first cover 30 to be sufficiently translucent enough to permit photography therethrough. In some embodiments, the transmissive properties of the first cover 30 are such that a light or other electromagnetic source directed through the cover will yield enough transmission of the desired light or other electromagnetic radiation to facilitate photography.

As shown in FIGS. 1-5 and in FIGS. 8-9, reflectors may vary in shape from the embodiment shown in FIGS. 6-7. As used herein any three-dimensional object, such as, without limitation any of the embodiments depicted in FIGS. 1-9, may be described in terms of the projected area it will have when viewed or depicted in a single orthographic projection view. An orthographic projection views may be any of a front view, a right side view, a left side view, a top view, a bottom view, or a back view. Because the subject matter of interest relates to reflectors, unless otherwise noted, the front view of a reflective surface will be the view that presents or projects the greatest reflective area. An orthographic projection view will have a projected area that will have a perimeter and may be discussed or characterized in terms of the size and shape of its perimeter.

FIGS. 1-2 show two embodiments of umbrella-type photographic reflectors each of which approximates a sub-section of an elliptic paraboloid. While an elliptic paraboloid may be commonly referred by the simpler term "parabola", as used herein the stricter term, "elliptic paraboloid", will be used in order to avoid ambiguity or loss of generality. As shown in FIGS. 1-5 and 8-9, each subsection 82 may be described as that portion of the elliptic paraboloid 84 between a first imaginary plane 94 and a second imaginary plane 96 in which the first imaginary plane 94 intersects the elliptic paraboloid 84, is substantially parallel to the vertex 98 of the elliptic paraboloid 84, and is offset from the vertex 98 by some non-zero distance in a first direction 91, and the second imaginary plane 96, intersects the elliptic paraboloid 84, is substantially parallel to the vertex 98, and is offset from the vertex 98 by some non-zero distance in a second direction 92 opposite the first direction 91. The umbrella-type photographic reflector 10 shown in FIG. 1 has a reflective inner surface 32 for which the frontal view is along the central post 22 and the perimeter 12 of the frontal view is a substantially oval shape approximated by a polygon having a number of sides equal to the number of ribs 24. In FIG. 1, the number of ribs 24 is 16, so that the substantially oval shape is approximated by an irregular hexadecagon. The umbrella-type photographic reflector 10 shown in FIG. 2 has a reflective inner surface 32 for which the frontal view is along the central post 22 and the perimeter 12 of the frontal view is a substantially oval shape approximated by a polygon having a number of sides equal to the number of ribs 24. In FIG. 2, the number of ribs 24 is 8, so that the substantially oval shape is approximated by an irregular octagon.

FIGS. 3-5 show an embodiment of an umbrella-type photographic reflector 10 which approximates a sub-section 82 of an elliptic paraboloid 84. Similar to the sections noted above with respect to FIGS. 1 and 2, in FIGS. 3-5, the sub-section 82 may be described as that portion of the elliptic paraboloid 84 between a first imaginary plane 94 and a second imaginary plane 96 in which the first imaginary plane 94 intersects the elliptic paraboloid 84, is substantially parallel to the vertex 98 of the elliptic paraboloid 84, and is offset from the vertex 98 by some non-zero distance in a first direction 91, and the second imaginary plane 96, intersects the elliptic paraboloid 84, is substantially parallel to the vertex 98, and is offset from the vertex by some non-zero distance in a second direction 92 opposite the first direction 91. FIGS. 3-5 show a photographic reflector 10 having a highly reflective inner surface 32 for which the frontal view is along the central post 22 and for which the perimeter 12 is a substantially oval shape approximated by a polygon having a number of sides equal to the number of ribs 24. In FIGS. 3-5, the number of ribs 24 is 16, so that the substantially oval shape is approximated by an irregular hexadecagon.

FIGS. 6-7 show an embodiment of an umbrella-type photographic reflector 10 which approximates a circular elliptic paraboloid 64. The umbrella-type photographic reflector 10 shown in FIGS. 6-7 has a reflective inner surface 32 for which the frontal view is along the central post 22 and for which the perimeter 12 is a substantially circular shape approximated by a polygon having a number of sides equal to the number of ribs 24.

In certain embodiments, an umbrella-type photographic reflector 10 may further comprise an additional panel 80 to further modify the reflection, absorption, or transmission of electromagnetic radiation R including, but not limited to, light incident thereupon. An umbrella-type photographic reflector 10 may comprise one or more of the additional panels 80. Additional panel 80 may be substantially reflective to, substantially opaque to, or substantially translucent to one or more kinds of electromagnetic radiation R including, but not limited to, light.

FIGS. 8-9 shows two embodiments of an umbrella-type photographic reflector 10 each of which approximates a subsection 82 of an elliptic paraboloid 84 and each of which comprises at least one additional panel 80. As shown in FIGS. 8-9, each subsection 82 may be described as that portion of the elliptic paraboloid 84 between a first imaginary plane 94 and a second imaginary plane 96 in which the first imaginary plane 94 intersects the elliptic paraboloid 84, is substantially parallel to the vertex 98 of the elliptic paraboloid 84, and is offset from the vertex 98 by some non-zero distance in a first direction 91, and the second imaginary plane 96, intersects the elliptic paraboloid 84, is substantially parallel to the vertex 98, and is offset from the vertex 98 by some non-zero distance in a second direction 92 opposite the first direction 91. The umbrella-type photographic reflector 10 shown in FIG. 8 has a reflective inner surface 32 for which the frontal view is along the central post 22 and for which the perimeter 12 is a substantially oval shape approximated by a polygon having a number of sides equal to the number of ribs 24. In FIG. 8, the number of ribs 24 is 16, so that the oval shape is approximated by an irregular hexadecagon. The umbrella-type photographic reflector shown in FIG. 8 has one additional panel 80 that is substantially contained by the first imaginary plane 94 and which is engaged with a portion of the perimeter 12 of the subsection 82 of the elliptic paraboloid 84. The umbrella-type photographic reflector 10 shown in FIG. 9 has a reflective inner surface 32 for which the frontal view is along the central post 22 and for which the perimeter 12 is a substantially oval shape approximated by a polygon having a number of sides equal to the number of ribs 24. In FIG. 9, the number of ribs 24 is 16, so that the oval shape is approximated by an irregular hexadecagon. The umbrella-type photographic reflector 10 shown in FIG. 9 has two additional panels, a first additional panel 95 that is substantially contained by the first imaginary plane 94 and which is engaged with a portion of the perimeter 12 of the subsection 82 of the elliptic paraboloid 84, and a second additional panel 97 that is substantially contained by the second imaginary plane 96 and which is engaged with a portion of the perimeter 12 of the subsection 82 of the elliptic paraboloid 84.

As noted above, frame 20 is skeletal in nature. Frame 20 may define a surface, such as without limitation, a concavity, by forming a set of points which lie upon the surface to be defined and to which another component, such as, without limitation, first cover 30 may be affixed in order to more fully define or "flesh out" the surface to be defined. In FIGS. 1-7, frame 20 provides a structure over which first cover 30 is affixed and together frame 20 and first cover 30 form and define the concave shape desired. In certain photographic reflectors 10, the reflective surface 32 will substantially approximate at least a subsection 82 of an elliptic paraboloid 84. Photographic reflectors 10 that are elliptic paraboloids 84 have a vertex 98 and particular reflective properties such that radiative rays emanating from a point source on the vertex 98 that impinge upon the photographic reflector 10 are reflected in such a way that the reflected radiation emanates in a substantially straight line parallel to the vertex 98. Some elliptic paraboloids 84 are circular paraboloids and some are not.

Given the complexity of elliptic paraboloids some umbrella-type photographic reflectors 10 are simplified such that they only approximate an elliptic paraboloid. It is to be understood that in umbrella-type photographic reflectors 10, as the number of ribs 24 increases, the photographic reflector 10 may better approximate a complex surface such as an elliptic paraboloid. An umbrella-type photographic reflector 10 may have eight ribs 24, sixteen ribs 24, or more ribs 24.

The embodiment of an umbrella-type photographic reflector 10 which approximates a sub-section 82 of an elliptic paraboloid 84 as shown in FIGS. 1, 2, and 3-5. 8, and 9 may have some properties of interest. Because the embodiments shown in FIGS. 1, 2, and 3-5, 8, and 9 lack a fully circular or elliptical paraboloid, they may be less awkward to handle than certain other types of reflectors. Also, the embodiments shown in FIGS. 1, 2, and 3-5, 8, and 9 provide a large surface area reflector that allows the vertex 98 to be more closely positioned with respect to a ceiling than certain other types of reflectors.

Illustrative embodiments have been described, hereinabove. It will be apparent to those skilled in the art that the above devices and methods may incorporate changes and modifications without departing from the general scope of this subject matter. It is intended to include all such modifications and alterations in so far as they come within the scope of the appended claims.

The invention claimed is:

1. A reflector comprising:
a frame being selectably adjustable between a deployed state and a collapsed state, said frame
defining a first concavity when in the deployed state, and being defined by a plurality of planar mechanisms,
   each of said planar mechanisms being selectably adjustable between a deployed state and a collapsed state,
   each of said planar mechanisms comprising,
      (i) an elongated shaft,
      (ii) a slider, slidably engaged with said elongated shaft to slide therealong,
      (iii) an elongated arcuate rotatable link, rotatably engaged with said elongated shaft, and
      (iv) a coupler rotatably engaged to both the slider and to the arcuate rotatable link:
a first compliant cover comprising a reflective surface, said first compliant cover being engaged with said frame, such that, when the frame is in a deployed state, said first compliant cover defines a second concavity having an internal concave surface defined by said reflective surface, said internal concave surface substantially coincides with the first concavity; and wherein, when in the deployed state, the reflective surface substantially approximates a subsection of an elliptic paraboloid having a vertex, the subsection being defined by a portion of the elliptic paraboloid between a first imaginary plane and a second imaginary plane wherein, the first imaginary plane, intersects the elliptic paraboloid, is substantially parallel to the vertex, and is offset from the vertex by a non-zero distance in a first direction, and the second imaginary plane, intersects the elliptic paraboloid, is substantially parallel to the vertex, and is offset from the vertex by a non-zero distance in a second direction opposite the first direction.

2. The reflector of claim 1, wherein said reflective surface is adapted to reflect light.

3. The reflector of claim 2, wherein said elliptic paraboloid is a substantially noncircular elliptic paraboloid.

4. The reflector of claim 2, wherein said elliptic paraboloid is a substantially circular elliptic paraboloid.

5. The reflector of claim 4, wherein each of said planar mechanisms comprises a slider-crank mechanism.

6. The reflector of claim 5, wherein the elongated shaft of each of said planar mechanisms is identically the same elongated shaft.

7. The reflector of claim 6, wherein the frame may be selectably adjusted between the deployed state and the collapsed state by sliding the slider along said elongated shaft.

8. The reflector of claim 7, wherein said plurality of ribs comprises 8 ribs.

9. The reflector of claim 8, wherein said plurality of ribs comprises 16 ribs.

10. The reflector of claim 9, further comprising a first panel substantially contained within said first imaginary plane.

11. The reflector of claim 10, wherein said first panel substantially contained within said first imaginary plane is substantially opaque to light.

12. The reflector of claim 11, further comprising a second panel substantially contained within said second imaginary plane.

13. The reflector of claim 12, wherein said second panel substantially contained within said second imaginary plane is substantially opaque to light.

14. The reflector of claim 13, further comprising a second compliant cover secured to said frame in covering relation with said reflective surface of said first compliant cover, said second compliant cover comprising a light diffusive material.

15. A reflector comprising:

a frame being selectably adjustable between a deployed state and a collapsed state, said frame defining a first concavity when in the deployed state, and being defined by at least sixteen slider-crank mechanisms, each of said slider-crank mechanisms being selectably adjustable between a deployed state and a collapsed state, each of said slider-crank mechanisms comprising, (i) an elongated shaft, (ii) a slider, slidably engaged with said elongated shaft to slide therealong, (iii) an elongated arcuate rotatable link, rotatably engaged with said elongated shaft, and (iv) a coupler rotatably engaged to both the slider and to the arcuate rotatable link, and wherein, the elongated shaft of each of said slider-crank mechanisms is identically the same elongated shaft, and the frame may be selectably adjusted between the deployed state and the collapsed state by sliding the slider along said elongated shaft;

a first compliant cover comprising a light reflective surface, said first compliant cover being engaged with said frame, such that, when the frame is in a deployed state, said first compliant cover defines a second concavity having an internal concave surface defined by said light reflective surface, said internal concave surface substantially coincides with the first concavity;

a second compliant cover secured to said frame in covering relation with said light reflective surface of said first compliant cover, said second compliant cover comprising a light diffusive material;

wherein, when in the deployed state, the light reflective surface substantially approximates a subsection of a circular paraboloid having a vertex, the subsection being defined by a portion of the circular paraboloid between a first imaginary plane and a second imaginary plane wherein, the first imaginary plane, intersects the circular paraboloid, is substantially parallel to the vertex, and is offset from the vertex by a non-zero distance in a first direction, and the second imaginary plane, intersects the circular paraboloid, is substantially parallel to the vertex, and is offset from the vertex by a non-zero distance in a second direction opposite the first direction;

a first panel substantially contained within said first imaginary plane, said first panel being substantially opaque to light; and a second panel substantially contained within said second imaginary plane, said second panel being substantially opaque to light.

16. The reflector of claim 7, wherein the reflective surface has a perimeter comprising a polygon having a number of sides equal to the number of ribs and wherein the perimeter is substantially oval shaped.

17. The reflector of claim 16, wherein said plurality of ribs comprises 8 ribs, wherein said polygon has 8 sides and wherein the substantially oval shape of the perimeter is approximated by an irregular octagon.

18. The reflector of claim 17, wherein said plurality of ribs comprises 16 ribs, wherein said polygon has 16 sides and wherein the substantially oval shape of the perimeter is approximated by an irregular hexadecagon.

* * * * *